June 26, 1956  G. T. FELBECK ET AL  2,752,591
EARTH STRATA CUTTING INDICATORS FOR REMOTELY
CONTROLLED BORE MINING MACHINES
Filed Sept. 19, 1952  3 Sheets-Sheet 3
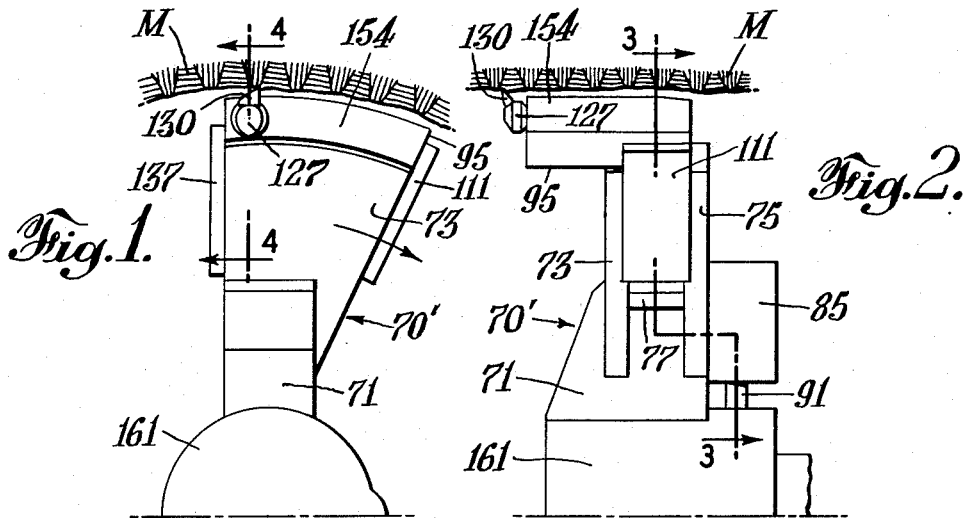
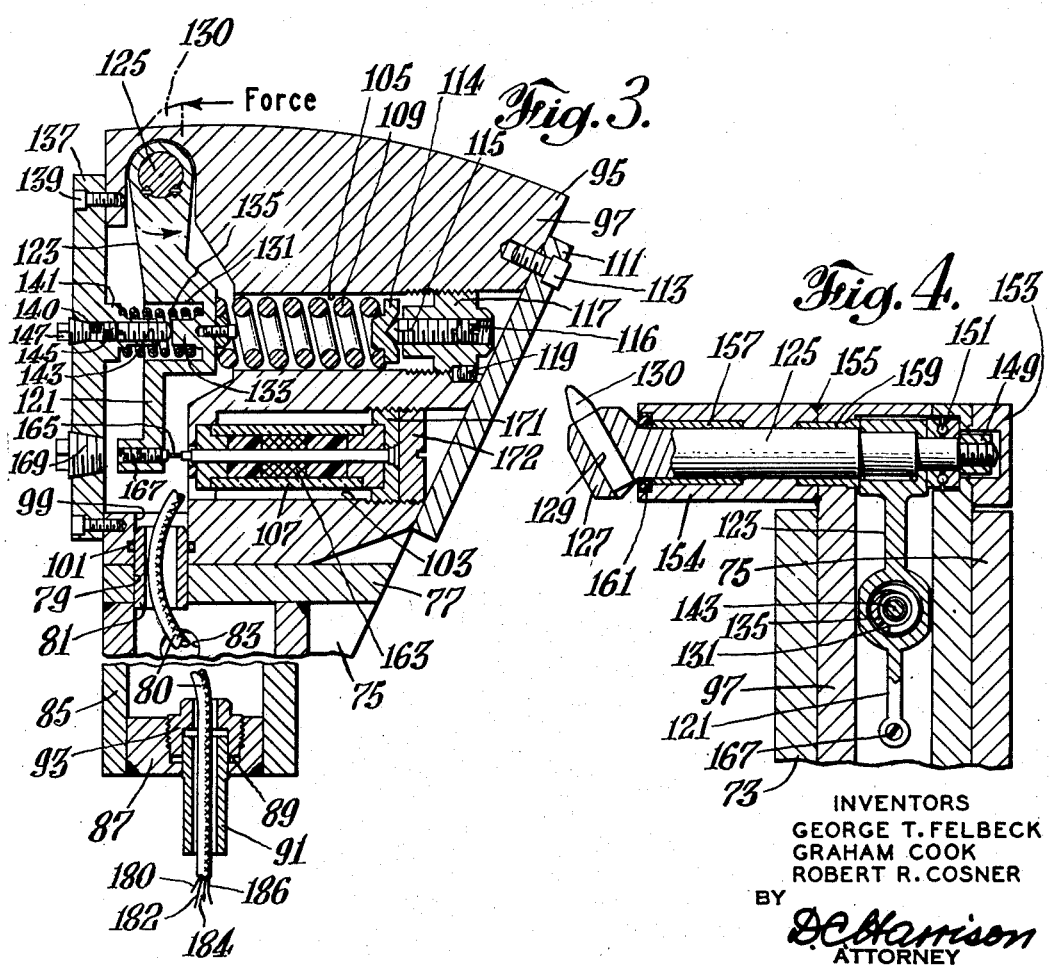
INVENTORS
GEORGE T. FELBECK
GRAHAM COOK
ROBERT R. COSNER
BY
D.C. Harrison
ATTORNEY

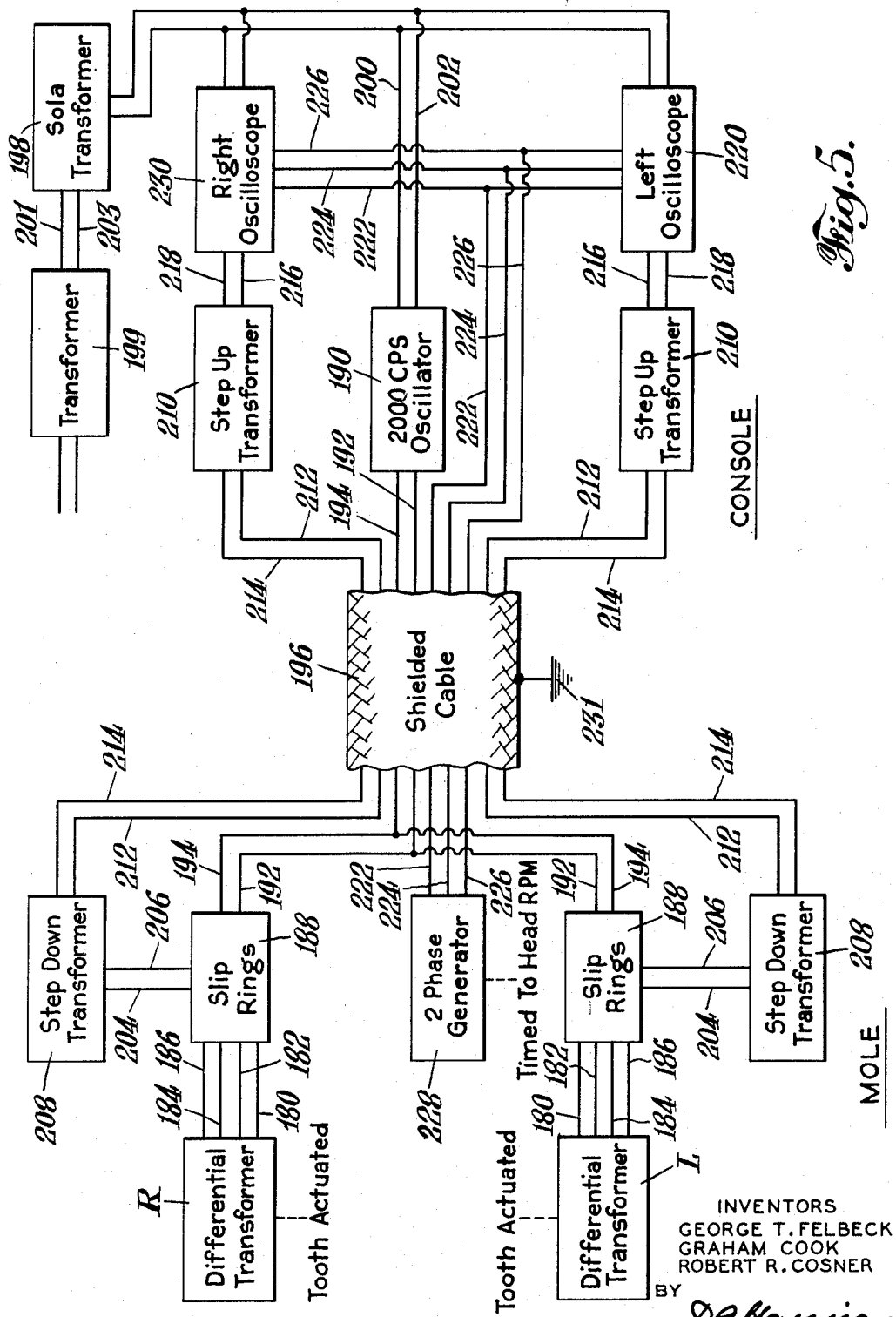

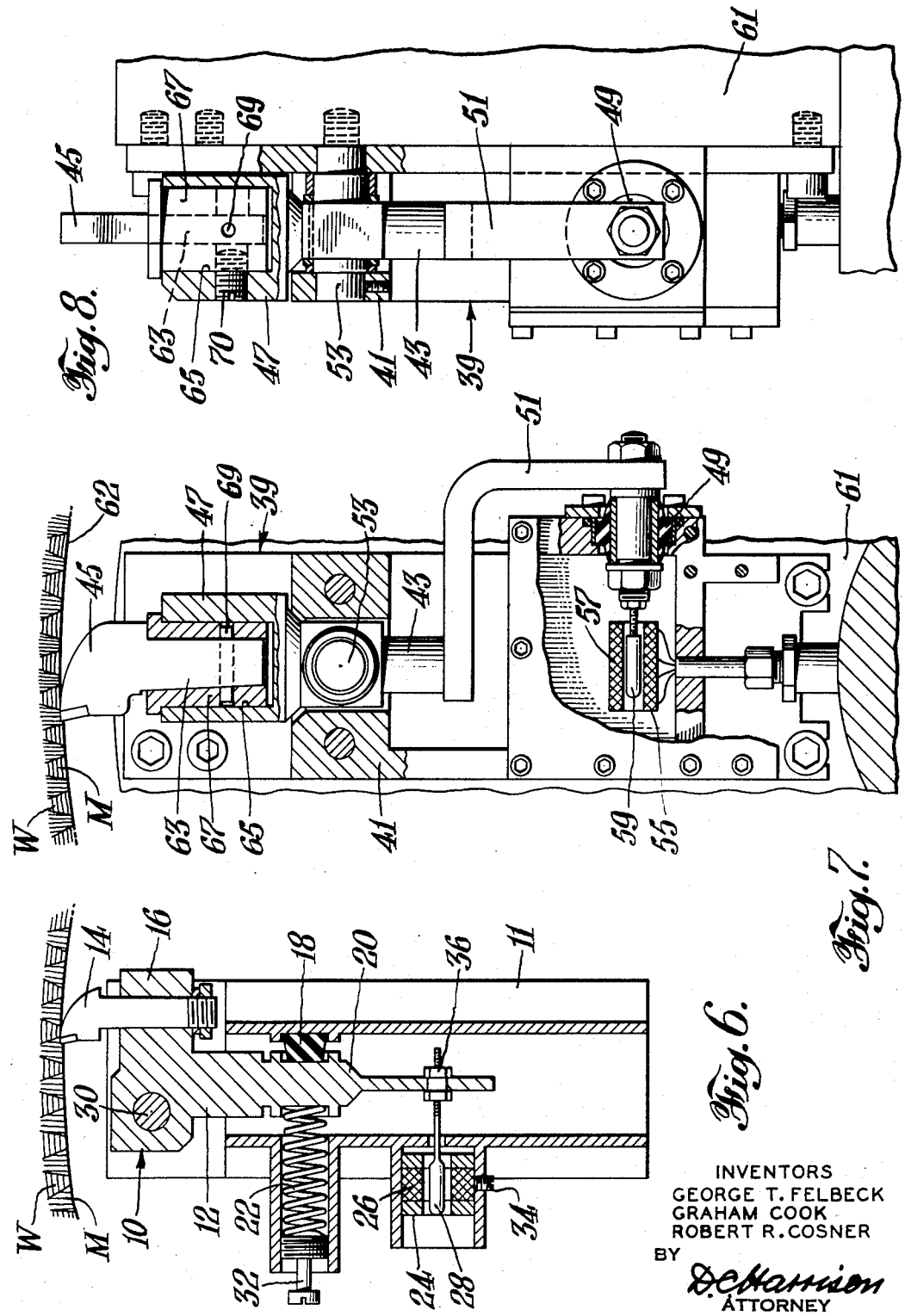

United States Patent Office 2,752,591
Patented June 26, 1956

2,752,591

EARTH STRATA CUTTING INDICATORS FOR REMOTELY CONTROLLED BORE MINING MACHINES

George T. Felbeck, Princeton, N. J., and Graham Cook and Robert R. Cosner, South Charleston, W. Va., assignors to Union Carbide and Carbon Corporation, a corporation of New York Application September 19, 1952, Serial No. 310,526

8 Claims. (Cl. 340—261)

This invention relates to earth strata indicators, and more particularly to continuously indicating strata cutting-scanning systems for remotely controlled bore-type mining machines.

In the copending application of Alspaugh and Cook, Serial No. 138,148, filed January 12, 1950, for "Earth Strata Cutting Indicator," now Patent No. 2,620,386, dated December 2, 1952, there is disclosed a system for continuously indicating the strata being cut by a bore mining machine in which the pickup consists of a carbon-pile compression rheostat which is operated by a strata-scanning tooth mounted on the rotary cutting head by a compression rubber mount which was primarily responsive to vibratory movements of the tooth. In such system a Selsyn transmitter and receiver arrangement is used to drive a remotely located two-phase generator in synchronism with the drive shaft of the cutting head. The output of the carbon-pile pickup is supplied through an electrical cable to an impedance matching transformer and in turn supplied to a cathode ray-polar coordinate oscilloscope. The output of the two-phase generator is also supplied to such an oscilloscope, so that in operation a synchronized visual indication of the strata being cut by such tooth is continuously indicated, that is, when the tooth is for example at 12 o'clock on the cutting head circle, the beam hits the oscilloscope face at 12 o'clock on the circular trace.

In such a prior system, the strata indications were relative, but not quantitative. Inasmuch as the carbon-pile pickup consisted of a compression rheostat composed of individual disks, considerable variations occurred in such disks because of aging, wear and vibration during operation. Furthermore, with a carbon-pile pickup, unless the initial compression of the pile was very carefully adjusted, the disks were subject to breakage, and the indications for different earth strata, such as shale, bone, coal, stone, etc. were not as marked or as reproducible as might be desired. Also the mounting of the scanning tooth in such a device had limited sensitivity because in operation the effective portion of the rubber mount was under compression. In addition the location of the strata-scanning tooth was somewhat behind the front of the cutter so that the head was subject to serious damage due to rock faults before such fact was indicated by engagement of the scanner tooth therewith.

Another disadvantage of such system was that it required a Selsyn transmitter mounted on the boring machine as well as a Selsyn receiver located at the remote station, and the necessary wiring coupling such Selsyns.

The main objects of the present invention are to overcome such disadvantages and difficulties and to obtain a more reliable and a more nearly quantitative indication of the various strata before any damage can occur to the cutting head; to provide an improved system for obtaining such indications; and to provide an earth strata cutting indicator which is simple, rugged and economical in its parts, efficient and economical in operation, and which can be used in combination with a bore mining machine to provide a reliable guide for directing the course of the machine in any desired strata from a remote station outside the bore hole. Another object of the invention is to provide an improved mounting of the scanning-cutting tooth, so that such tooth can be easily replaced, so that the pickup is protected from dirt and moisture, yet is sufficiently sensitive to cutting forces that a more precise signal is obtained. Another object is to provide an earth strata cutting-indicating system in which it is possible to precalibrate the indicator for various earth strata, and reliably to reproduce the results without recalibration of the indicator. A further object is to provide a simple system for obtaining, picking up, transmitting and receiving signals indicating the strata of the face being cut by a bore mining machine having at least two laterally spaced bore-type cutters. A still further object is to provide improved and simpler means for synchronizing the rotary travel of the strata-scanning teeth with the relative work-hardness signals transmitted to the oscilloscope to indicate the location as well as the material of the strata being cut by such cutters, respectively. Other objects are to avoid a compression type carbon-pile pickup, and to avoid the use of a transmitter and receiver Selsyns.

According to the invention, such objects are accomplished by providing a forwardly positioned scanning tooth with a unique mounting which is responsive to cutting torque as distinguished from vibration, and in which a displacement type transducer is used as the pickup. Only one two-phase generator is used in the present system, it being mounted on the machine and geared to at least one of the rotary strata-cutters for synchronous operation therewith. The signals are transmitted from each scanning tooth to corresponding oscilloscopes which are also connected to the two-phase generator, which synchronizes the motion and position of the beam of the cathode ray tube of each oscilloscope exactly with the motion and position of the scanner tooth providing continuous indications of the position and strata being cut by the respective scanning teeth mounted on such cutters.

More specifically the invention involves a novel strata-indicating system comprising means carrying the strata-scanning tooth which is mechanically responsive to the relative torque applied to such tooth in cutting in situ earth materials of different hardness, and pickup means associated with such tooth-carrying means which is electrically responsive to relative movement of such mechanically responsive means, so that the relative torque applied to such tooth in cutting different earth materials in situ results in a signal the relative amplitude of which corresponds to such relative cutting torque. Signal transmission means is coupled to the pickup and leads to a station remote therefrom which is provided with an earth strata-indicator coupled to said signal transmission means, and responsive to such relative torque signals, whereby the amplitude of the signal is responsive to the hardness of the material scanned by said tooth, and thus is characteristic of the material itself.

The process of the invention comprises measuring the actual relative force necessary to scarf-cut samples of each of the several materials of which the underground earth strata are likely to be composed, bore-mining underground earth strata, continuously deriving a signal which is responsive to the cutting torque applied to a strata-scanning tooth used in such bore-mining, conducting such signal to a station outside of the bore, receiving the signal at such station, and translating the received signal into visual indications corresponding to the relative forces used by said strata-scanning tooth in scarf-cutting such materials in situ. Such indications serve to identify the various materials of the actual earth strata scanned by such tooth by comparison with such prior relative cutting force measurements of the sample materials.

In the drawings:

Figs. 1 and 2 are front elevational, and side elevational views, respectively, of a preferred modification of the scanning tooth assembly;

Figs. 3 and 4 are cross-sectional views taken on lines 3—3 and 4—4, respectively, of Figs. 2 and 1;

Fig. 5 is a circuit diagram illustrating the new system;

Fig. 6 is view mainly in section of a scanning tooth assembly illustrating the principal elements of the invention;

Fig. 7 is a similar enlarged view of a modification; and

Fig. 8 is a side view of the modification shown in Fig. 7.

The present invention is based on the discovery that the signal from the positional component of the stratascope transducer is more informative than the signal from the vibrational component. By the positional component is meant that movement of the tooth due to its being forced back by the material cut. The vibrational component is the vibration of the tooth and its mount about this point after it is "cocked back." The carbon-pile transducer of application Serial No. 138,148 is not entirely satisfactory for such purpose for the reasons noted above.

As shown in Fig. 6 there is provided a scanner tooth assembly 10 comprising the combination with a support 11, of a lever 12 pivoted to said support, a work cutter-scanner tooth 14 mounted on an arm 16 of said lever, a resilient stop 18 disposed between said support and an arm 20 of said lever, and a spring 22 mounted on said support, urging such arm 20 against said resilient stop, so that force exerted upon the tooth in cutting different materials W is opposed by the force of said spring. A differential-transformer transducer 24 is provided comprising stationary windings 26 mounted on said support, and a movable core 28 mounted on the arm 20 of said lever, whereby such different materials W cut by said tooth 14 cause the tooth to move which results in corresponding movement of the core 28 which in turn has a characteristic effect on the signal output of said transducer 24, depending upon the relative force exerted by the tooth 14 in cutting each material, which is resisted by said spring 22.

Pivot 30 on which the lever 12 is mounted is supported at both ends because a pivot supported at one end only permits too much lateral motion of the arm 20. Several means are also provided for adjusting: (1) the initial compression of spring 22, comprising a screw 32; (2) the differential transformer position, comprising a set screw 34; and (3) the relative position of the moving transformer core, comprising a bolt 36. With an A. C. input to the primary of the transformer 24 of from five to seven volts at a frequency of 2000 cycles per second, a typical oscillogram was obtained in the laboratory by cutting a test pitch cylinder containing single pieces of ordinary coal, hard coal, and rock, with the assembly 10. The signals obtained were the type needed to make a stratascope system successful, i. e., having wide signal amplitude differences for materials of varying hardness. The two coal samples in the test cylinder were not too different in hardness, yet they were easily differentiated, while at the same time rock signal was beyond the scale of a five-inch oscilloscope screen. For the two samples of coal, the amplitude of movement of the transformer core 28 was too small to be observed visually; however the amplitude of the motion produced by rock was of the order of one-eighth to one-quarter of an inch.

A working scanner tooth assembly 39 is shown in Figs. 7 and 8. Such assembly comprises the combination with a support 41, of a lever 43 pivoted to said support, a work cutting scanner tooth 45 mounted on an arm 47 of said lever, and an annular rubber shear mount 49 resiliently connecting an arm 51 of said lever with said support so that the lever 43 can rock in either direction about the axis of pivot 53 to a limited degree, the force exerted upon the tooth 45 in cutting being opposed by the force of such mount 49. A transducer is provided comprising a differential transformer 55 including stationary windings 57 mounted on said support, and a movable core 59 mounted on an arm of said lever, whereby different materials M cut by the tooth 45 have a characteristic effect on the output of the transducer 59, depending upon the relative force exerted by the tooth in cutting the material which is resisted by such mount 49.

The assembly support 39 is removably mounted on a rotary bore-cutting head 61 of a bore mining machine (not shown), so that the strata-scanning tooth 45 actually cuts around the interior annular wall portion of the bore 62 made by such machine. Shank 63 of tooth 45 is removably mounted in a radial socket 65 provided therefor in the arm 47 by a suitable bushing 67, pin 69, and set-screw 70, so that the tooth can be quickly replaced in case of breakage, yet is secured firmly in place in use.

The differential transformer scanner tooth assembly 39 was tested on a bore mining machine and movements of the transformer core 59 effected clear indications on the oscilloscope, with no interference from noise due to pickup in the cable or in the two slip-ring systems. An oscillator hooked up as set forth below operated satisfactorily, giving a clear and stable carrier signal when the output of the oscillator was 2000 cycles per second.

Figs. 1–4 illustrate a work cutting scanner tooth block type stratascope assembly 70' for the left hand cutter head L of a bore mining machine having a plurality of bore type cutter heads arranged in side-by-side relation. A similar assembly is associated with the right hand cutter head. Such assembly includes a stratascope head arm 71 attached to the cutter head 161. Such arm 71 includes spaced front and rear plates 73, 75 between which is welded a rear panel 77 provided with an opening 79 in which is mounted a nipple 81 for the passage of a cable 80 (containing electrical conductors 180, 182, 184, 186—Fig. 5—which are described below). The plate 75 is also provided with an opening 83 for the passage of such cable 80 into a box 85 having a bottom wall 87. Such wall 87 has an opening 89 in which a conduit pipe 91 terminates, the latter being secured in place by a packing nut 93, sealing the wall opening and the periphery of the conduit against the entrance of foreign matter.

The remainder of the stratascope assembly 70 comprises a unit 95 which is removably mounted on the arm 71 between the front and rear plates 73, 75, and in contact with the rear panel 77 thereof. Socket head cap screws, not shown, are used to secure the unit 95 in such place. The stratascope unit 95 comprises a body block 97 having a rear opening 99 which receives a portion of the nipple 81, a seal being provided by an O-ring 101 composed of suitable resilient material such as silicon rubber. The block 97 is also provided with suitable cylindrical chambers 103 and 105 within which are disposed a transducer 107 and a compression main spring 109, respectively. The chambers are closed at one end by a common back cover 111 secured in place by a screw 113 which engages a socket in the block 97. The spring 109 is supported at its rear end under the cover 111 by a floating pilot 114 which pivots on a pointed screw 115, the latter being threaded in a central passage in an adjustable main spring backing nut 117 which, in turn, is threaded to the block 97 in the end portion of the chamber 105. Such nut 117 and screw 115 provide means for critically adjusting the initial load on the main spring 109. The nut 117 is secured in adjusted position in chamber 105 by a lock screw 119; and the screw 115, by a jam screw 116.

The front end of spring 109 engages an inner arm 121 of a lever 123 comprising a rock shaft 125 having an outer arm 127 provided with an inclined socket 129 in which is mounted the shank of a work cutting scanner tooth 130. The side of the arm 121 opposite spring 109 is provided with a socket 131 containing a central stud 133 for positioning one end of a compression counterbalance-spring 135, the other end of which bears against a common front cover 137 which is held in place on the block 97 by screws 139. The cover 137 is also provided with a spring centering stud 141, and with a hole 140 in which is threaded a "take-off" adjusting screw 143, the inner end of which normally contacts the top of stud 133 on arm 121. The other end of screw 143 is engaged by a jam screw 145 which is also threaded in the hole 140, the latter being closed and sealed by a suitable tapered screw plug 147.

Rock shaft 125 is in the form of a bolt provided at its rear end with a nut 149 which secures a ball bearing 151 in place thereon; a small cover 153 being secured to the block 97 over such nut. The shaft 125 extends through a common bore provided therefor in the block 97 and in a forwardly extending arcuate member 154 which is welded to the front face of such block at 155, suitable bushings 157, 159 being provided in such bore, constituting additional bearings for the shaft. An annular metal-to-rubber-to-metal bonded seal 161 is provided between the forward end of the bore and shaft 125. Thus, when the shaft 125 is rocked by movement of the scanning-cutting tooth 130 against the force of spring 109, the degree of such rocking is proportional to the relative torque applied to the tooth in cutting different earth materials M in situ as the head 161 rotates.

Such movements are transmitted through arm 121 to an armature or core 163 of the transducer 107, such as a differential transformer, by a transfer rod 165 which is secured at one end in a socket provided therefor in the outer end of arm 121, a jam nut 167 closing the other end of the socket. An opening in the cover 137 in line with such nut 167, which is normally closed by a removable plug 169, provides access to the nut 167. The rear end of the transducer 107 is supported by a pilot nut 171 which is engaged by a jam nut 172, both of which are threaded in the rear end portion of chamber 103, providing means for accurately adjusting the transducer "zero."

As shown in Fig. 5 tooth-actuated-differential transformer transducers R and L are mounted on the right and left rotary cutter heads of the bore-mining machine, each being connected by suitable conductors 180, 182, 184, 186 to suitable slip rings 188. Brushes corresponding to the slip rings leading to conductors 180, 182, are connected to a common A. C. oscillator 190, remotely located with respect to such machine, by conductors 192, 194 which extend through a shielded cable 196. The oscillator 190, in turn, is connected to a common "Sola" constant-voltage supply transformer 198 by conductors 200, 202. The transformer 198 is, in turn, connected to a supply transformer 199 by conductors 201, 203.

In operation the oscillator 190 supplies the input circuit of the transducer with current at a frequency of 2000 C. P. S. The brushes of the slip rings 188 leading to signal output conductors 184, 186 are connected by conductors 204, 206 to a step down or cable impedance matching transformer 208 which is, in turn, connected to a step up or cable impedance matching transformer 210 by conductors 212, 214 which also extend through the cable 196. Conductors 216, 218 connect the transformer 210 to the signal input circuit of a left oscilloscope 220, the base input circuit of which is connected by conductors 222, 224, 226, extending through cable 196, to a common 2-phase generator 228 which is driven synchronously with the cutter head on which the scanner-cutter tooth assembly is mounted. A right oscilloscope 230 is similarly connected to such 2-phase generator, and to the right transducer R, respectively.

Since the cable 196 may be substantially long, i. e., about 1000 feet long in some cases, it is shielded, grounded at 231, and of relatively low impedance. In use the cable 196 is unwound from a reel (not shown) located outside of the bore being made by the machine as the mining operation progresses. The right and left stratascope systems are calibrated before boring is started to indicate the relative torque applied to the scanner teeth in cutting the various materials which are likely to be encountered by the machine. Such calibration is effected by having a series of known forces, in pounds, push against the scanner tooth while the cutting head is at rest. The voltage of the signal produced by movement of the tooth is measured by a vacuum tube voltmeter, thus giving a direct measure of the cutting force in pounds against the signal produced by the cutting tooth in volts. When the cutter head is in motion this voltage output is measured by the amplitude of the signal displayed on the oscilloscope screen.

Thus, even when the bore mining machine is out of sight, the oscilloscopes quantitatively indicate the hardness of the different strata actually being cut by the respective scanning teeth which are located on right and left hand cutting heads in front of the main cutting teeth thereof, such hardness indications being visible before the main cutting teeth encounter such strata.

We claim:

1. An earth strata indicating system for remotely controlled bore mining machines having rotary cutting heads provided with main cutting teeth, comprising the combination of a strata cutting-scanning tooth mounted in front of said main teeth on at least one of such heads, means whereby the relative torque or force applied to such tooth in cutting the various strata likely to be encountered thereby is translated into electrical signals the relative amplitude of which corresponds to such cutting torque, means transmitting such signals to an oscilloscope, and means synchronizing the time base of such signals with that of said tooth, whereby the relative hardness and position and the strata cut by said tooth are indicated on said oscilloscope before the main cutting teeth of such head encounter such strata.

2. In a bore mining system, a remotely controlled machine comprising at least two transversely spaced strata cutting rotary heads, and the combination therewith of means continuously indicating at a station remote therefrom the hardness of the several strata actually being cut by at least one of such heads as the mining operation progresses, comprising an oscilloscope corresponding to such cutter head, a 2-phase generator, means driving said generator in synchronism with the rotation of said head, means conducting the 2-phase output of said generator to the time base circuit of said oscilloscope, a cutting-torque responsive scanner-tooth mounted on said head, a transducer carried by said head, means coupling each transducer to the scanner tooth, an alternating current oscillator, means conducting the output of said oscillator to the input circuit of said transducer, the signal output circuit of the transducer supplying a signal the relative amplitude of which is proportional to the relative hardness of the materials comprising the strata being cut at the time by such scanner tooth, and means conducting such signals to the signal input circuit of the corresponding oscilloscope, so that such oscilloscope continuously indicates the relative hardness of the strata of the face of the bore being cut by said head in synchronism therewith.

3. In a bore mining system, the combination as defined by claim 2, in which the transducer signal conducting means comprises an impedance matching transformer mounted on the machine, and an impedance matching transformer located at such remote station.

4. In a bore mining system, the combination as defined by claim 3, in which the means which conduct alternating current oscillations from the oscillator to the transducer, and the signals from the transducer to the impedance matching transformer, comprise slip rings mounted on each cutting head.

5. In a bore mining system, the combination as defined by claim 2, in which the transducer is a differential transformer comprising stationary primary windings electrically connected to said oscillator, a stationary secondary winding electrically connected to the corresponding oscilloscope, and a movable core mechanically connected to the corresponding scanner tooth.

6. In a bore mining system, the combination as defined by claim 2, in which the conducting means comprise insulated conductors contained in a flexible shielded cable of relatively low impedance which is grounded, which cable is elongated to reach from the machine to such remote station, and is attached at one end to such machine.

7. In a bore mining machine, the combination as defined by claim 2, in which the scanner tooth is positioned so as to engage the outer peripheral face of the bore in front of the main teeth of the rotary cutter, so that an indication of rock, for example, is indicated by the oscilloscopes before the main teeth are damaged by such rock.

8. An earth strata indicating system for remotely controlled bore mining machines having rotary cutting heads provided with main cutting teeth, comprising the combination of a strata cutting-scanning tooth mounted on at least one of such heads, means whereby the relative torque or force applied to such tooth in cutting the various strata likely to be encountered thereby is translated into electrical signals the relative amplitude of which corresponds to such cutting torque, means transmitting such signals to an oscilloscope, and means synchronizing the time base of such signals with that of said tooth, whereby the relative hardness and position of the strata cut by said tooth are indicated on said oscilloscope.

References Cited in the file of this patent
UNITED STATES PATENTS

| | | |
|---|---|---|
| 2,037,938 | Spencer | Apr. 21, 1936 |
| 2,281,960 | Vacquier | May 5, 1942 |
| 2,396,935 | Walstrom | Mar. 19, 1946 |